US 6,260,340 B1

(12) United States Patent
Sanner

(10) Patent No.: US 6,260,340 B1
(45) Date of Patent: Jul. 17, 2001

(54) LAWN MOWER DECK WASHING APPARATUS

(76) Inventor: Walter Sanner, 146 Inges Ct., Shepherdsville, KY (US) 40165-9659

( * ) Notice: Subject to any disclaimer, the term of this patent is extended or adjusted under 35 U.S.C. 154(b) by 0 days.

(21) Appl. No.: 09/448,199

(22) Filed: Nov. 23, 1999

(51) Int. Cl.[7] ....................................... A01D 34/82
(52) U.S. Cl. .............................. 56/16.8; 56/320.1
(58) Field of Search ..................... 56/16.8, 320.1, 56/320.2, DIG. 9, 16.7

(56) References Cited

U.S. PATENT DOCUMENTS

| 3,214,893 | * | 11/1965 | Griffin . |
| 3,535,862 | * | 10/1970 | Wittwer . |
| 3,648,446 | * | 3/1972 | Haapoja et al. . |
| 3,856,028 | | 12/1974 | Kehler . |
| 3,905,181 | | 9/1975 | Messner . |
| 4,762,278 | * | 8/1988 | Taylor . |
| 5,027,590 | | 7/1991 | Stark . |
| 5,312,047 | | 5/1994 | Akers . |
| 5,499,492 | | 3/1996 | Jameson . |
| 5,651,242 | | 7/1997 | Kittridge . |
| 5,673,856 | | 10/1997 | Krohn . |
| 6,145,288 | * | 11/2000 | Tamian et al. . |

* cited by examiner

Primary Examiner—H. Shackelford
(74) Attorney, Agent, or Firm—Polster, Lieder, Woodruff & Lucchesi, L.C.

(57) ABSTRACT

Apparatus (20) for cleaning a lawn mower (10) after its use in mowing a lawn. The mower has a deck (14a, 14b) beneath which are mounted grass cutting blades (B). When cutting grass, grass clippings and other debris accumulate on the underside of the deck. The apparatus comprises a flexible tubing (24, 54) routed over an outer surface of the deck. Ends of the hose attach to a coupling (28) which, in turn, is attached to a source of water through a shut-off valve (30) for water to circulate through the hose. A plurality of fittings (32, 60) are installed in the hose at locations along its length. The fittings extend through a sidewall (40, 56) of the tubing and through the mower deck. Each fitting has a bore (38, 66) extending through the fitting for water circulating through the tubing to be drawn through the fitting and sprayed on the underside of the mower deck. The water flushes away the accumulated grass clippings and other debris. A splash plate (90) commonly mounted on a shaft (S) with the mower blades includes fins (94a, 94b) to redirect water sprayed from the fittings.

14 Claims, 4 Drawing Sheets

LAWN MOWER DECK WASHING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to lawn mowers, and more particularly, to apparatus for cleaning lawn mowers such as push mowers and riding mowers after they have been used to cut the grass.

Power mowers used to cut grass have a housing or cowling under which the mower blades are housed. As grass is cut, blades of grass get drawn up against the underside of the housing. Because of moistness and the pressure exerted on the blades, the blades compact so that by the time a grass cutting operation is complete there is a layer of compacted material compressed against the underside of the mower. If this material is not cleaned away, it will, over time, effect the mower's efficiency. For a push mower, turning the mower on its side and spraying the underside with a hose to flush the accumulated clippings and other debris away may be a relatively simple task if the mower is a smaller, lightweight mower. However, for larger, heavier mowers and large deck mowers such as riding mowers, many of which include more than one set of blades, this is not so simple.

Various approaches have been previously tried to provide a mower cleaning system by which the user can readily clean a mower after use. One such approach has been to install a coupling or fitting on the mower housing. A hose such as a garden hose attaches to the fitting and water flowing through the fitting is then sprayed into the underside of the mower housing. U.S. Pat. Nos. 5,499,492, 5,027,590, and 3,905,181 are exemplary of this approach. A second approach is to provide a manifold or rail which is connectable to the end of a hose or water valve. The mower is rolled over the manifold, the water is turned on, and openings in the manifold or rail allow the water to spray upwardly against the underside of the housing. U.S. Pat. Nos. 5,673,856, 5,651,242, and 3,856,028 are exemplary of this approach.

While devices incorporating these approaches may be effective to clean the underside of a mower, both have drawbacks. With the former, the pattern of distribution may not be such as to completely or efficiently flush the accumulated material away. With the latter, the device not only must be separately stored, but because the device is beneath the mower, clippings, dirt, small rocks, etc. may wash into the holes through which the water spouts, plugging or blocking the holes and reducing the efficiency of the device.

BRIEF SUMMARY OF THE INVENTION

Among the several objects of the present invention may be noted the provision of apparatus installed on a lawn mower for cleaning grass clippings, gum, dirt, and other debris from the underside of the mower after the mower has been used. It is further a provision of the apparatus to be installed on a mower as original equipment, or provided in kit form for retrofitting a mower. The apparatus is usable on push mowers having a single set of blades, or on a larger mower such as a riding mower which may have several sets of blades. Another provision of the apparatus is its ready connection to a hose or spigot so water can be circulated through the apparatus to flush away the material accumulated on the underside of the mower housing. The apparatus employs fittings mounted on the housing and having bores through which water flows to the underside of the housing. Importantly, the bores are so shaped as to direct water flow at "hard to reach" areas of the housing thereby to thoroughly clean the underside of the housing. In addition, the mower can be run while the water is running with the rotating blades creating a suction effect that increases the water pressure of the flow against the housing so to increase the cleansing action. A splash plate is provided which will be installed beneath the mower blades. The splash includes fins and the splash plate functions to produce better distribution of water on the underside of the mower housing for better cleaning. The apparatus is relatively low cost, is easy to install, does not clog, and requires little maintenance.

In accordance with the invention, generally stated, apparatus is provided for cleaning a lawn mower after it is used to mow a lawn. The mower has a deck beneath which are mounted grass cutting blades. When cutting grass, grass clippings and other debris accumulate on the underside of the deck. The apparatus comprises a hose routed over, and mounted to, an outer surface of the deck. Ends of the hose are attached to a tee-coupling whose other end is connected to a water hose or spigot through a shut-off valve. When the shut-off valve is opened, water circulates through the hose. A plurality of fittings are installed in the hose at locations along its length. The fittings extend through a sidewall of the hose and through the mower deck. Each fitting has a bore defining a water passage which extends through the fitting. Water circulating through the hose is drawn through the fittings and is sprayed on the underside of the mower deck. The water flushes away the accumulated grass clippings and other debris. Other objects and features will be in part apparent and in part pointed out hereinafter.

BRIEF DESCRIPTION OF THE SEVERAL VIEWS OF THE DRAWINGS

In the drawings.

FIG. 10 is a plan view illustrating another embodiment of the invention.

Corresponding reference characters indicate corresponding parts throughout the drawings.

DERAILED DESCRIPTION OF THE INVENTION

Figure 1:
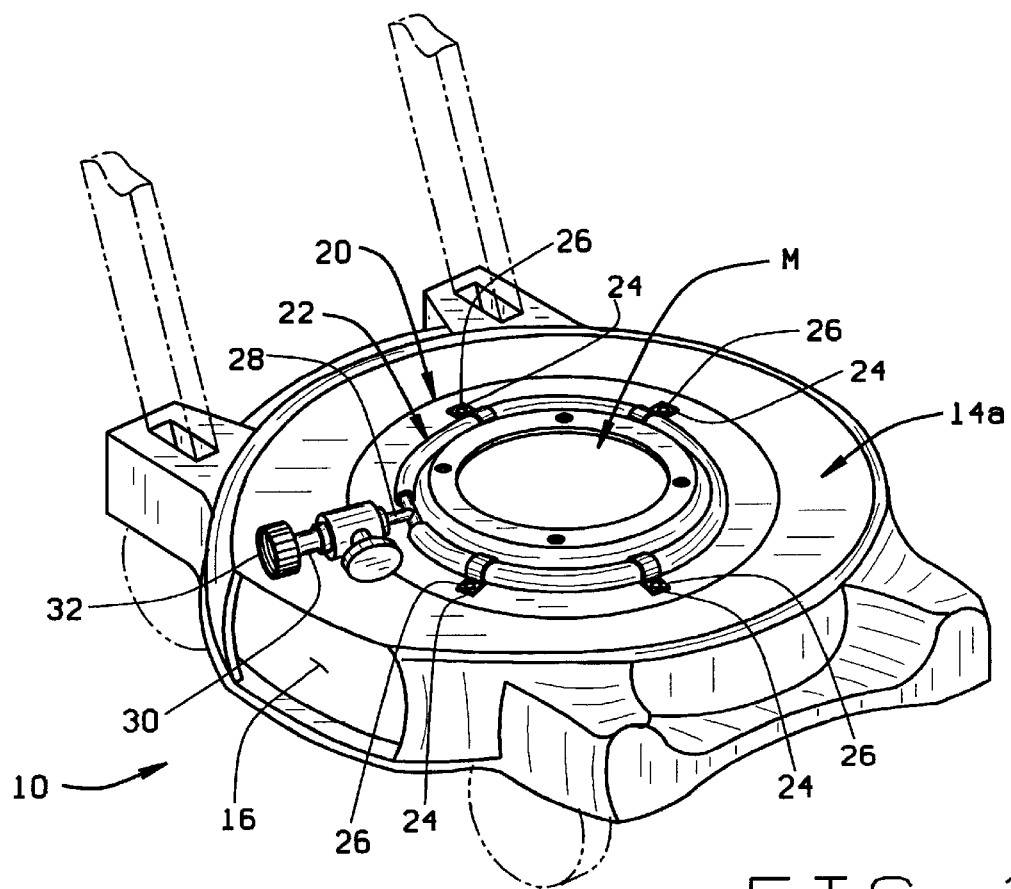
FIG. 1 is a perspective view of a push mower illustrating installation of the apparatus of the present invention.

Referring to the drawings, a power mower such as a push mower is indicated generally 10 in FIG. 1. A riding mower is indicated generally 12 in FIG. 3. Push mower 10 typically includes a single set of grass cutting blades and riding mower 12 multiple sets of these blades. Referring to FIG. 4, a cutting blade B has a central hub H which is connected to a rotatable shaft S. The shaft, in turn, is connected to the drive shaft of a gasoline powered or electric motor such as the motor M indicated in FIG. 1. The motor/shaft connection can either be by direct drive or by a belt and pulley system. Regardless, when the motor is energized, the shaft rotates at a high rate of speed for sharpened sections P of the cutting blade to slice through the blades of grass or the stalks of weeds.

Figure 3:
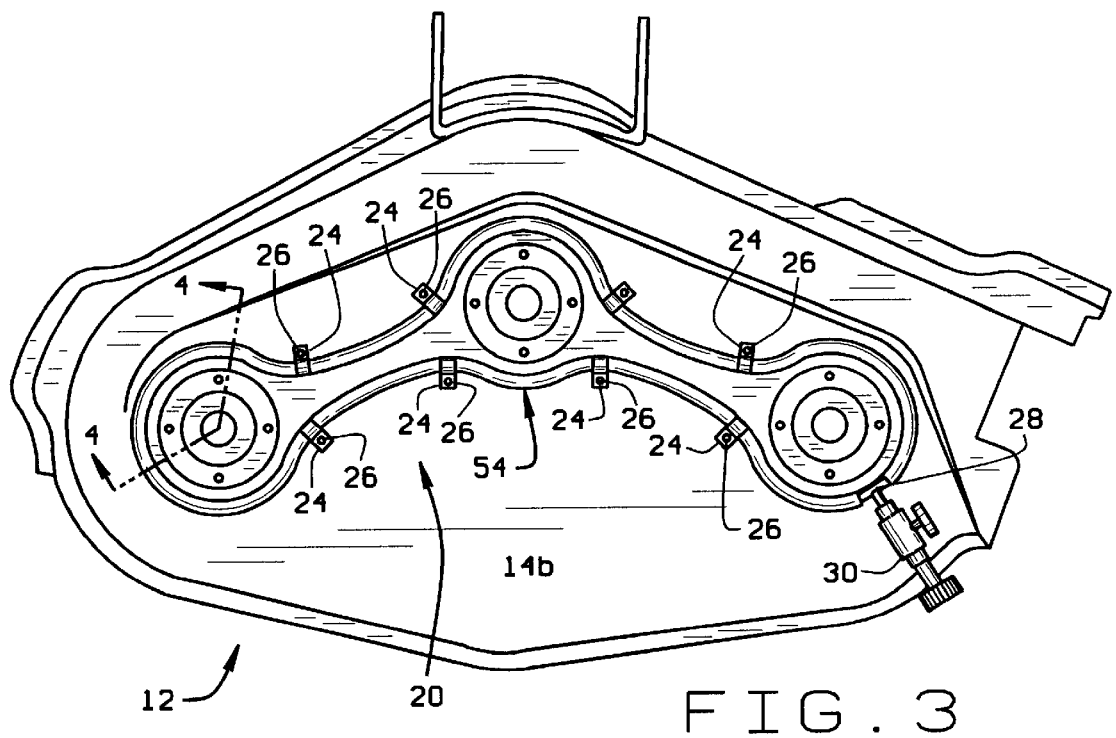
FIG. 3 is a top plan view of a deck of a riding mower indication installation of a second embodiment of the apparatus.
Figure 4:
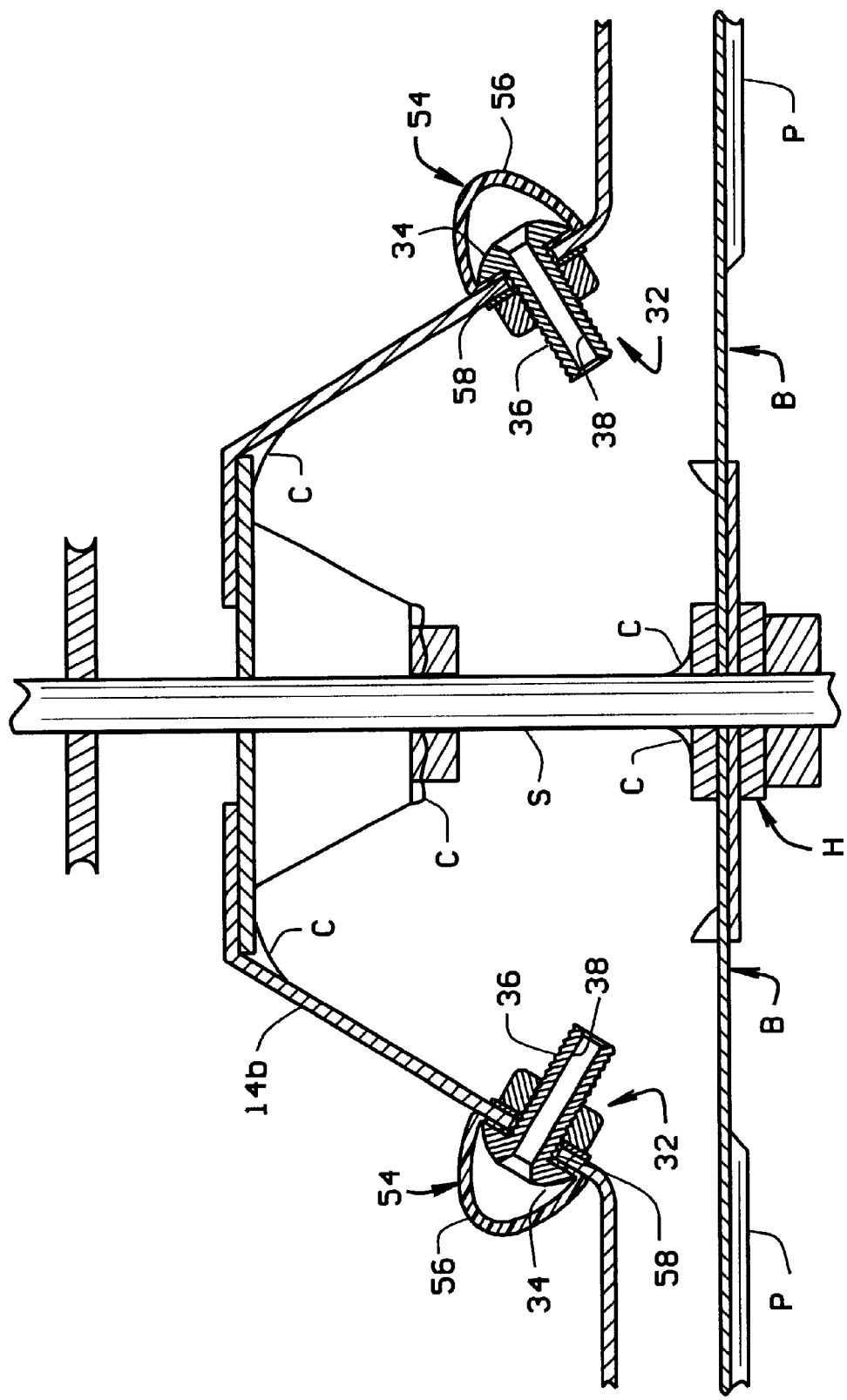
FIG. 4 is a sectional view of the installed apparatus taken along line 4—4 in FIG. 3.
Figure 8A:
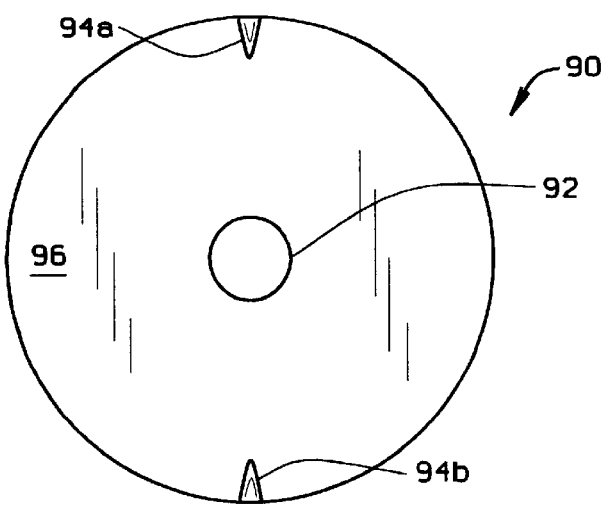
FIGS. 8A–8C are respective top plan, and side and end elevational views of a splash plate used to obtain better water distribution for cleaning purposes.
Figure 8B:
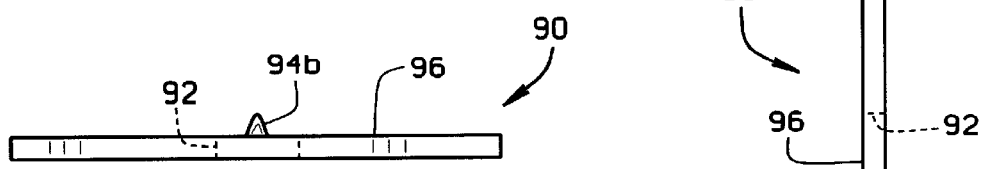
Figure 8C:
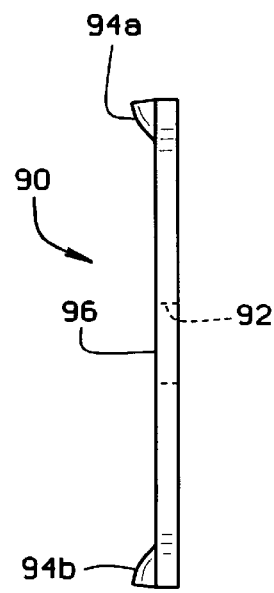
Figure 9:
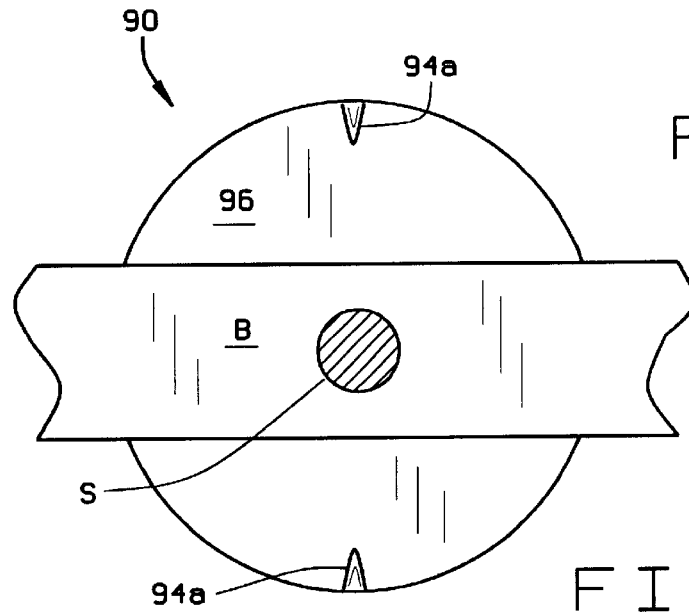
FIG. 9 illustrates installation of the splash plate.

The cutting blades are mounted on the underside of a mower deck or housing 14a (FIG. 1) or 14b (FIG. 3). The deck has an opening 16 in one side for discharging grass clippings off to the side or into an optional collection bag (not shown). However, as indicated in FIG. 4, clippings C, dirt, debris, gum, etc., collects against the underside of the housing, on the hub, against wheel axles; in general, anywhere where this material can collect. To clean the underside of a mower after use and flush away this accumulated material, apparatus 20 of the present invention is shown in FIG. 1 to first include a flexible tubing or hose section 22 mounted on an outer surface of housing 14a. The tubing has a length sufficient to substantially encircle the central section of the mower housing where motor M is mounted. Straps 24 are used to secure the hose in place. While four straps are shown in FIG. 1, it will be understood that more, or fewer straps can be used. Each strap has a curved end which fits over the hose and a flat end for securing the strap and hose to the mower deck using screws 26, for example. The ends of tube 24 are attached to two ends of a tee shaped coupling 28. The other end of coupling 28 connects to the outlet end of a shut-off valve 30. An inlet end 32 of the shut-off valve is connectable to the end of a water hose, or it is attached to a water spigot. When the valve is turned "on", water from the hose or spigot circulates through tubing 24.

Figure 2:
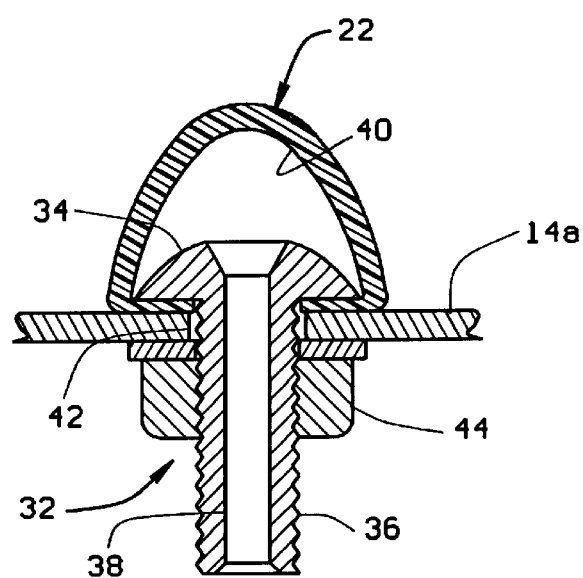
FIG. 2 is an elevational view, in section, of a portion of the apparatus as installed.

Referring to FIG. 2, a plurality of fittings 32 are installed in tubing 24 at locations along the length of the tubing. The fittings comprise spray nozzles and each fitting comprises a bolt having a head 34 and a threaded shank 36. Further, a water passage extends through the fitting. This passage is formed by a longitudinal bore 38 extending completely through the fitting. The threaded shank of the fitting extends through a sidewall 40 of tubing 24, and through a hole 42 drilled through housing 14a A lock nut 44 is threaded onto the shank of the fitting and tightened down against the underside of the housing. When nut 44 is tightened a waterproof seal is formed between fitting 32, hose 22 and the mower housing. Now, when the shut-off valve is turned "on", the water pressure in the tubing forces water through the passages 38 in each fitting. The resulting water spray strikes the blades with a force sufficient to flush away the grass clippings and other accumulated material. The intensity of the spray can be increased by turning the spigot more fully open, thus increasing the volume of flow through tubing 24. It will be understood that the direction of spray is controlled at the angle at which the fittings are installed in the mower housing. If the fittings extend vertically through the housing, then the water will strike the mower and splash blades and be redirected against the underside of the housing. The mower is turned on together with the water flow so the rotation of the blades creates a suction at the outlet of the water passages 38 drawing water through the passages at a high rate of flow which, in turn, makes for a more powerful spray.

Referring to FIGS. 3 and 4, for riding mowers with multiple sets of blades apparatus 20 includes a longer tubing piece 54. This piece of tubing winds around each section of the mower housing beneath which one of the sets of mower blades is mounted. As before, straps 24 and screws 26 are used to secure the tubing to the outside of the mower deck 14b. The ends of tube 54 are attached to two ends of tee shaped coupling 28 with the other end of the coupling again connected to the outlet end of shut-off valve 30. As in the other embodiment, inlet end 32 of the shut-off valve connects to the end of a water hose or is attached to a water spigot. As shown in FIG. 4, fittings 32 are installed in tubing 54 at locations along the length of the tubing. Each fitting again has a head 34, threaded shank 36, and a water passage is formed by a longitudinal bore 38 extending through the fitting. The threaded shank of the fittings extend through a sidewall 56 of tubing 54, and through a hole 58 drilled through housing 14b. The fittings are again secured by a nut 44 threaded onto shank 36 of the fitting, and a lock washer (not shown) seals the rubber, or flex hose, against the upper side of the housing when the nut is tightened. The fittings also serve to hold the flexible, or rubber, 33 hose in place. Operation of the apparatus is as previously described.

Apparatus 10 can be installed on lawn mowers as original equipment, or it can be retrofitted onto a mower. If the latter, the apparatus is provided in kit form. The kit then includes the tubing, straps, teecoupling, shut-off valve, and fittings. Installation of the kit can be done using common work tools including a drill, wrench and screwdriver.

Figure 5:
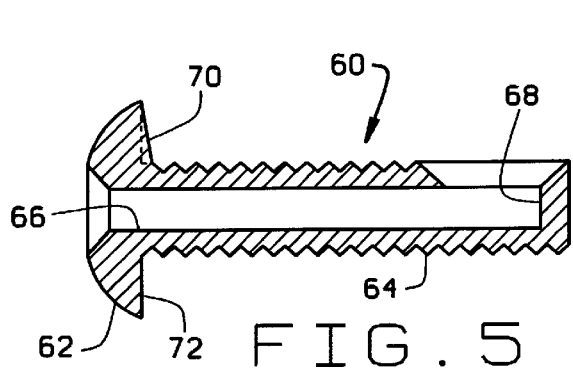
FIG. 5 is an elevational view, in section, of a "jet" bolt used with the apparatus for spraying water against the underside of a mower housing.
Figure 6:
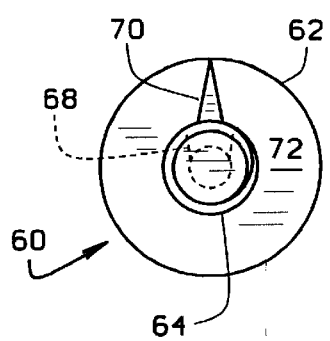
FIG. 6 is a bottom plan view of the jet bolt.
Figure 7:
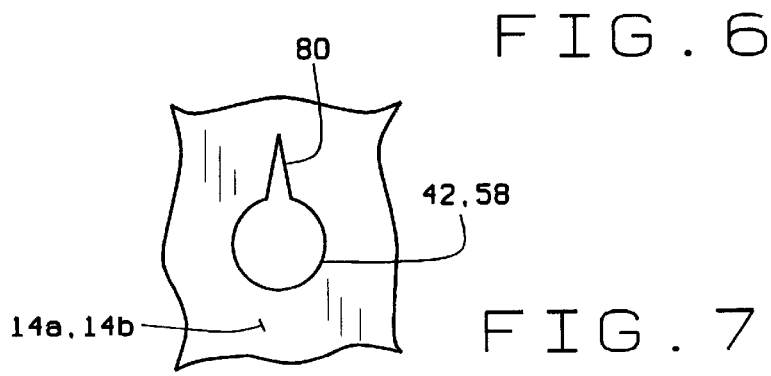
FIG. 7 is a broken-away view of a portion of the mower deck illustrating a keyed opening for insertion of a jet bolt.

Referring to FIGS. 5–7, another embodiment of a spray nozzle used in the apparatus is shown. This fitting, indicated generally 60, comprises a "jet" bolt having a head 62 and threaded shank 64. Now, the fitting includes a longitudinal bore 66 extending from the head of the bolt substantially, but not completely, the length of the bolt. A cross-bore 68 extends inwardly from a sidewall of the shank, orthogonally of the longitudinal axis of the bolt, at the distal end of bore 66. This cross-bore forms an outlet opening in the side of the shank for water flowing through the passage defined by the bore and cross-bore. This construction has the advantage of allowing the water to be directed at a specific area of the underside of the housing so hard to clean areas are easily reached.

To help aim the spray from a fitting 60, a bolt positioning key 70 is formed on an underside 72 of bolt head 62. The key, which as shown in FIG. 6, is aligned with the outlet formed by cross-bore 68, is formed by machining away material on either side of the key so to form a chamfered surface. A slot 80 for the key is formed in the outer surface of the mower deck. The slot allows the bolt to be so aligned that the water sprayed out of the fitting is directed at the desired location on the underside of the mower deck. After an opening, or cut, 42 or 58 is made in respective housing 14a or 14b, a tapered slot 80 is made using a rasp, file, punch, or other appropriate tool. When the fitting is then installed during assembly of the apparatus, the fitting 60 is rotated until key 70 drops into slot 80. The lock washer and nut are then threaded onto the shank and tightened to lock the fitting in place and seal the rubber or flex hose against the top of the deck.

FIGS. 8A–8C, and 9 illustrate a splash plate 90 usable with apparatus 10 to further enhance the cleaning of grass and other debris during a flushing operation. Plate 90 is a generally drcular plate having a central, circular opening 92 sized for the plate to be mounted on the same shaft S as the mower blades B (see FIG. 9). The width of the plate is substantially greater than that of the blades. Opposed fins 94a, 94b extend above an upper surface 96 of plate 90. Those skilled in the art will recognize that while only two fins are shown, the plate could have more than two fins. When used, the plate is mounted beneath the blades on shaft S. Now, water sprayed from the nozzles will strike the plate and be directed upwardly against the underside of the housing. If the blades are turning at this time, the fins 94a, 94b further help redirect the spray against the inner housing surface to enhance the washing away of the accumulated material.

The above described embodiments of the present invention have both been installed on lawn mowers and when tested, found to work satisfactorily.

Referring to FIG. 10, a third embodiment of the present invention includes a hose section 100 mounted to the outer surface 14a of a mower housing. As before, the section of hose is installed using straps 24 and screws 26. Now, one end 100a of the hose section is connected to a shut-off valve 30 while the other end of the hose is blocked by a plug 102. Fittings (not shown) extend through the sidewall of the hose section and the mower in the same manner as previously described. In use, mower M is started and the shut-off valve is opened. Water flowing through the hose section is drawn through the hoses in the fittings by the suction created by the turning mower blades. Substantially all of the water entering the inlet end of the hose is drawn off so there is no build up or back flow of water in the hose section.

What has been described is apparatus installed on a lawn mower including both a push mower having a single set of blades or a riding mower with multiple blade sets. The apparatus is installed either as original equipment, or as a retrofit. A hose is mounted on the outside of the mower deck or cover with the hose ends connected to a coupling by which water from a hose or spigot is circulated through the hose. Fittings incorporating water flow passages are installed in the hose and extend through the mower deck to direct sprays of water at the underside of the lawn mower. Water spray thoroughly cleans the underside of the housing from accumulated grass clippings, dirt, debris, and gum. If the mower is run while the water is running, the mower blades create a suction effect which increases the water pressure of the flow against the housing and enhances the cleansing action. The apparatus is easy to install, does not clog, and requires little maintenance.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus installed on a lawn mower to clean the lawn mower after its use in mowing a lawn, the lawn mower including a deck having an outer surface and an underside, mower blades being mounted on the underside of the deck to cut the grass with grass clippings and other debris accumulating on the underside of the deck as the grass is being cut, the apparatus comprising:
   a hose routed over the outer surface of the mower deck;
   attaching means for attaching the hose to the outer surface of the mower deck and including a plurality of straps which fit about the hose at spaced intervals and fasteners for attaching an end of each strap to the mower deck;
   a coupling to which at least one end of the hose attaches, the coupling attaching to a source of water for water to circulate through the hose, the coupling including a shut-off valve connected to a water inlet end of the hose and to a water source to control water flow into the hose; and,
   a plurality of spray nozzles installed in the hose at locations along the length thereof, the nozzles extending through a sidewall of the hose and through the mower deck, each nozzle having a bore extending therethrough whereby water flowing through the hose flows through the nozzle and sprays on the underside of the mower deck to flush away accumulated grass clippings and other debris.

2. The apparatus of claim 1 wherein the hose comprises a flexible tubing.

3. Apparatus installed on a lawn mower to clean the lawn mower after its use in mowing a lawn, the mower including a mower deck having an outer surface and an underside on which are mounted blades which cut the grass with grass clippings and other debris accumulating on the underside of the deck as the grass is being cut, the apparatus comprising:
   a hose routed over the outer surface of the mower deck;
   a coupling to which at least one end of the hose attaches, the coupling connecting to a source of water for water to circulate through the hose; and,
   a plurality of spray nozzles installed in the hose at locations along the length of the hose, the nozzles extending through a sidewall of the hose and through the mower deck, each nozzle having a bore extending therethrough whereby water flowing through the hose flows through the nozzle and sprays on the underside of the mower deck to flush away accumulated grass clippings and other debris, each nozzle comprising a bolt having a threaded shank received in an opening in the mower deck with the hose having an opening therein in which the bolt is received.

4. The apparatus of claim 3 wherein the bolt has a longitudinal bore extending therethrough and defining a flow passage by which water flowing through the hose flows through the fitting.

5. The apparatus of claim 3 wherein the bolt has a bore extending from a head of the bolt through a portion of the shank, a cross-bore extending orthogonally of a longitudinal axis of the bolt at a distal end of the bore to form an opening in a side of the shank by which water flowing through a water flow passage defined by the bore and cross-bore is directed at the underside of the mower deck.

6. The apparatus of claim 5 wherein the bolt further includes a bolt positioning key formed on an underside of the bolt head, and a slot for the key formed in the outer surface of the mower deck, the slot allowing the bolt to be so aligned as to direct water flowing out of the water flow passage at a desired location on the underside of the mower deck.

7. Apparatus installed on a lawn mower to clean the lawn mower after its use in mowing a lawn, the mower including a deck having an outer surface and an underside on which is located mower blades mounted on a shaft for cutting the grass, grass clippings and other debris accumulating on the underside of the deck as grass is cut, the apparatus comprising:
   a hose routed over the outer surface of the mower deck;
   a coupling to which at least one end of the hose attaches, the coupling attaching to a source of water for water to circulate through the hose;
   a plurality of spray nozzles installed in the hose at locations along the length thereof, the nozzles extending through a sidewall of the hose and through the mower deck, each nozzle having a bore extending therethrough whereby water flowing through the hose flows through the nozzles and sprays on the underside of the mower deck to flush away accumulated grass clippings and other debris, and, a splash plate commonly mounted on the shaft with the blades to rotate with the shaft, fins being formed on an upper surface of the plate so when the shaft is turning and water is sprayed from the nozzles, the plate and the fins redirect the water at the underside of the deck to further help wash away the grass clippings and other debris.

8. The apparatus of claim 7 wherein the plate is a circular plate.

9. A cleaning kit installed on a lawn mower for cleaning the lawn mower after its use, the mower having a housing with an outer surface and an underside on which are mounted grass cutting blades for cutting the grass, grass clippings and other debris accumulating on the underside of the housing as the grass is cut, the kit comprising:

a flexible tubing mounted on the outer surface of the housing;

a shut-off valve through which water from a source thereof flows into an inlet end of the tubing for water to flow through the tubing; and, a plurality of spray nozzles installed in the tubing at locations along the length thereof, each nozzle extending through a sidewall of the tubing and into the housing and each nozzle further including a bore extending therethrough whereby water circulating through the tubing is directed through the bore and sprayed on the underside of the housing to flush away the accumulated grass clippings and debris, and each nozzle including a fitting comprising a bolt having a threaded shank received in an opening in the housing with the hose having an opening therein in which a head of the bolt is received.

10. The kit of claim 9 further including attaching means for attaching the tubing to the outer surface of the housing, and sealing means providing a waterproof seal about each opening formed in the tubing and through which an outer end of the bolt extends.

11. The kit of claim 9 wherein the bolt has a longitudinal bore extending therethrough and defining a flow passage by which water flowing through the hose flows through the fitting.

12. The kit of claim 11 wherein the bolt has a bore extending from the head of the bolt through a portion of the shank, a cross-bore extending orthogonally of a longitudinal axis of the bolt at a distal end of the bore to form an opening in a side of the shank by which water flowing through a water flow passage defined by the bore and cross-bore is directed at the underside of the housing.

13. The kit of claim 12 wherein the bolt further includes a bolt positioning key formed on an underside of the bolt head, and a slot for the key formed in the outer surface of the mower deck, the slot allowing the bolt to be so aligned as to direct water flowing out of the water flow passage to directed at a desired location on the underside of the housing.

14. A cleaning kit installed on a lawn mower for cleaning the lawn mower after its use, the mower having a housing with an outer surface and an underside on which are located mower blades mounted on a shaft for cutting the grass, grass clippings and other debris accumulating inside the housing when the mower is in use, the kit comprising:

a flexible tubing mounted on the outer surface of the housing;

a shut-off valve through which water from a source thereof flows into an inlet end of the tubing for water to flow through the tubing; and, a plurality of spray nozzles installed in the tubing at locations along the length thereof, each nozzle extending through a sidewall of the tubing and into the housing and including a bore extending therethrough whereby water circulating through the tubing is directed through the nozzle bore and sprayed on the underside of the housing to flush away the accumulated grass clippings and debris; and, a splash plate commonly mounted on the shaft with the blades to rotate with the shaft, the splash plate having a plurality of fins being formed on an upper surface thereof so when the shaft is turning and water is sprayed from the nozzles, the plate and the fins redirect the water at the underside of the housing to wash away the grass clippings and other debris.

* * * * *

UNITED STATES PATENT AND TRADEMARK OFFICE
CERTIFICATE OF CORRECTION

PATENT NO. : 6,260,340 B1            Page 1 of 1
DATED : July 17, 2001
INVENTOR(S) : Sanner It is certified that error appears in the above-identified patent and that said Letters Patent is hereby corrected as shown below:

Column 2,
Line 64, replace "DERAILED DESCRIPTION OF THE" with -- DETAILED DESCRIPTION OF THE --

Column 4,
Line 62, replace "drcular" with -- circular --

Signed and Sealed this

Ninth Day of April, 2002

Attest:

JAMES E. ROGAN
*Attesting Officer*     *Director of the United States Patent and Trademark Office*